United States Patent [19]

Dupuy et al.

[11] 4,246,069
[45] Jan. 20, 1981

[54] HEAT-GENERATING NUCLEAR REACTOR

[75] Inventors: Gerard Dupuy, Paris; Maurice Fajeau, Pertuis; Michel Labrousse, Bourg-la-Reine; Bernard Lerouge, Jouy-en-Josas; Jean-Luc Minguet, Velizy, all of France

[73] Assignee: Commissariat a l'Energie Atomique, Paris, France

[21] Appl. No.: 920,695

[22] Filed: Jun. 30, 1978

[30] Foreign Application Priority Data

Jul. 5, 1977 [FR] France ............................ 77 20588

[51] Int. Cl.² ........................................... G21C 19/28
[52] U.S. Cl. ..................................... 176/65; 176/62; 176/87
[58] Field of Search ....................... 176/62, 63, 64, 65, 176/87

[56] References Cited

U.S. PATENT DOCUMENTS

| 3,226,301 | 12/1965 | Bernard et al. | 176/63 X |
| 3,305,450 | 2/1967 | Maldague | 176/65 X |
| 3,498,880 | 3/1970 | Gollion | 176/65 X |
| 3,793,143 | 2/1974 | Müller | 176/63 X |
| 3,951,738 | 4/1976 | George et al. | 176/62 X |
| 4,033,814 | 7/1977 | Bregeon et al. | 176/62 X |
| 4,115,192 | 9/1978 | Jogand | 176/65 X |
| 4,124,067 | 11/1978 | Bonnet et al. | 176/65 X |
| 4,156,629 | 5/1979 | Andreani et al. | 176/65 X |

FOREIGN PATENT DOCUMENTS 2283523   8/1974   France .

Primary Examiner—Peter A. Nelson
Attorney, Agent, or Firm—Kerkam, Stowell, Kondracki & Clarke

[57] ABSTRACT

A reactor vessel filled with coolant fluid is divided by a wall into an upper region and a lower region which contains the reactor core, part of the coolant fluid in the upper region being injected into the lower region. The injection flow rate is regulated as a function of the variations in pressure in the lower region by means of a baffle-plate container which communicates with a leak-tight chamber and with a storage reservoir, a flow of fluid from the chamber to the reservoir being established only at the time of a reduction in the rate of injection into the container. The reactor can be employed for the production of hot water which is passed through a heat exchanger and supplied to a heating installation.

10 Claims, 6 Drawing Figures

HEAT-GENERATING NUCLEAR REACTOR

This invention has for its object a heat-generating nuclear reactor derived from a pool-type reactor and designed for the production of hot water at a temperature of the order of 120° C. Among the potential applications which can be contemplated, the hot water can be passed through a heat exchanger, then supplied to a heating installation, for example.

It is known that a nuclear reactor of the pool type is a relatively low power reactor in which the core is immersed at the bottom of an enclosure constituting a pool filled with water and that the pool water serves both as moderator, as coolant and as a biological shield.

It is also known that a reactor of the type just considered can be employed for producing water at a temperature of the order of 110° to 120° C. on condition that the water pressure is maintained at a sufficient value to control thermohydraulic phenomena within the reactor core, that is to say at a value which is distinctly higher than 2 bar.

It will in fact be recalled that the pool of a reactor of this type is open at the top and that it is practically impossible for this reason to pressurize the water to high values. In consequence, a number of different solutions have been contemplated prior to the invention with a view to obtaining the necessary overpressure by simple means.

However, a notable disadvantage of these solutions lies in the fact that the overpressure just mentioned cannot be maintained within assigned limits during changes of reactivity of the reactor.

The present invention is precisely directed to a heat-generating nuclear reactor derived from the pool type which makes it possible to overcome the disadvantage mentioned in the foregoing and offers a number of different advantages, especially from a safety standpoint.

The heat-generating nuclear reactor in accordance with the invention essentially comprises a main vessel filled with coolant fluid and divided by a wall into two regions consisting respectively of an upper region and a lower region which contains the reactor core, at least one heat exchanger and at least one pump for circulating part of the coolant fluid between the outlet and the inlet of said reactor core through said heat exchanger. The reactor further comprises at least two pipes which open at each end into the lower region and into the upper region, means for injecting part of the fluid of the upper region into the lower region through one of said pipes and means for regulating the rate of injection of fluid into the lower region as a function of the variations in pressure of the fluid within this latter.

It should be made clear at this point that said lower and upper regions of the main vessel constitute respectively the reactor tank and the pool.

In the nuclear reactor as hereinabove defined, pressurization of the reactor tank fluid is thus advantageously performed by means of a fluid circuit or so-called pressurization circuit which is placed between the reactor tank and the pool and which incorporates said injection means and said means for regulating the injection flow rate. Said pressurization circuit operates continuously and is independent of the fluid circuit within the reactor tank or so-called primary circuit for cooling the reactor core.

It may further be noted that, by virtue of continuous communication between the reactor tank and the pool, re-immersion of the reactor core is rapidly obtained at the time of accidental depressurization of the reactor tank.

In accordance with the invention and in order to ensure automatic pressure regulation, the reactor is advantageously provided in addition with means which serve to control the aforesaid means for regulating the injection flow rate and with means for detecting the pressure of the fluid of the lower region or reactor tank and for actuating said control means.

Moreover, in accordance with a preferential and distinctive structural feature of the reactor in accordance with the invention, the dividing wall aforesaid is constituted by a compartment which communicates with said lower region and is delimited by a vertical shell and two horizontal partitions consisting respectively of a lower partition and an upper partition, the vertical shell and the upper partition being in contact with the fluid of the upper region. Moreover and in accordance with the invention, the dimensions and thermal resistance of the vertical shell and the upper partition are such as to permit of heat exchange between the fluids of the lower region and of the upper region corresponding to a percentage of the thermal power of the reactor within the range of 0.5 to 1.

Thus and by virtue of the distinctive features mentioned above, removal of residual power from the core after reactor shutdown can be obtained rapidly by utilizing the fluid of the lower region in order to recover the heat which is then transferred from this latter to the fluid of the upper region, the dimensions of said upper region being such as to ensure a sufficient degree of thermal inertia. This heat removal can in any case be carried out without any need to employ a mechanical device which would call for the use of an external source of energy.

In fact, in accordance with another distinctive feature of the invention, the heat exchangers and the pumps are advantageously placed at a higher level than that of the reactor core in order to ensure that circulation of the coolant fluid by natural convection is established in the lower region in the event of stoppage of the pumps.

In accordance with a particular arrangement of the invention, the reactor further comprises a gas accumulator, the water section of which communicates with the lower region.

This arrangement makes it possible to employ a simplified pressurization circuit having a long response time. It should be noted that, when making use of a pressurization circuit having a short response time, the accumulator has the sole function of cooperating with the pressurization circuit in the event of an accident condition resulting in very substantial variations in the volume of fluid of the reactor tank.

In accordance with the above-mentioned arrangement, said reactor core is preferably surrounded by a cylindrical jacket and surmounted by said gas accumulator, an extension of said cylindrical jacket above the reactor core being intended to house and support said accumulator which extends through said compartment.

In an arrangement contemplated by the invention, it should be explained that the reactor must have at least two pipes, one of which is provided with said injection means and said means for regulating the injection flow rate. However, the reactor can advantageously have three pipes, one of which is provided with the means aforesaid whilst the other two pipes open into bottom and top zones of the upper region. Thus, when a depressurization causes boiling of the reactor tank fluid, a flow of fluid can be established at the end of a predetermined interval from the pool to the reactor tank via the pipe which opens into the bottom zone of this latter whilst the vapor continues to escape through the pipe which opens into the top zone.

In accordance with another preferential arrangement of the invention, the reactor further comprises a container which communicates on the one hand with the upper region through said pipes and on the other hand with said lower region, baffle-plates being arranged within said container in such a manner as to ensure that a flow of coolant fluid is established from the lower region to the upper region only at the time of a reduction in the rate of injection of liquid into the lower region.

The advantage of this arrangement lies in the possibility of limiting the power losses related to the process of continuous charge and discharge which take place to an appreciable extent only at the time of overheating of the fluid of the lower region.

In accordance with the invention, the container aforesaid can be mounted so as to extend in leak-tight manner through the top partition of the horizontal wall, the top face of said container being provided with at least two orifices through which said pipes are intended to open and the lower end of said container being provided with orifices which open into said compartment.

In the case of a reactor in accordance with the invention in which the core is surrounded by a cylindrical jacket having an extension above the reactor core which supports a gas accumulator, said container can also be located in the upper portion of said accumulator, provision being made in the top face of said container for at least two orifices through which said pipes are adapted to open and in the lower portion of said container for orifices having their openings in the annular passage delimited around said accumulator by the extension of said cylindrical jacket, said annular passage being adapted to communicate with said compartment.

The invention also relates to a device for regulating the pressure of a fluid contained within a leak-tight chamber which communicates with a reservoir for the storage of said fluid.

The device aforesaid essentially comprises a container which communicates on the one hand with said reservoir through at least two pipes designated respectively as first and second pipes and on the other hand with said chamber, means for injecting fluid into said container through said first pipe and means for regulating the injection flow rate, said container being provided with baffle-plates arranged in such a manner that a flow of fluid from the chamber to the reservoir is established only at the time of a reduction in the rate of injection of fluid into said container.

The device which has been defined in the foregoing is particularly suitable for regulating the pressure of a hot fluid which is intended to transfer its heat into a utilization circuit and which may be the core coolant of a heat-generating reactor of the type hereinabove defined. In fact, by carrying out immediate recycling to the reservoir of that fraction of the injected fluid which does not serve to compensate for a reduction in pressure of the fluid in the chamber, said device makes it possible to limit heat exchanges between the hot fluid of the chamber and the cold fluid of the reservoir. By way of example, the chamber and the reservoir can be constituted by the lower and upper regions of a heat-generating reactor as described in the foregoing.

In more precise terms, the baffle-plates aforesaid are placed within said container in such a manner as to direct the fluid injected into said container through the first pipe towards the second pipe and to prevent any direct flow of fluid between each pipe and said chamber.

Furthermore, in order to permit of automatic operation, the regulating device hereinabove defined can comprise means which serve to control said means for regulating the injection flow rate and means for detecting the pressure of the fluid within the chamber and actuating said control means.

In a preferred embodiment of said device, the container aforesaid is located at least partly within the interior of said chamber.

Further distinctive features and advantages of the present invention will become more clearly apparent from the following description of embodiments of the reactor in accordance with the invention, said embodiments being given by way of illustration but not in any limiting sense, reference being made to the accompanying drawings, wherein.

Figure 1:
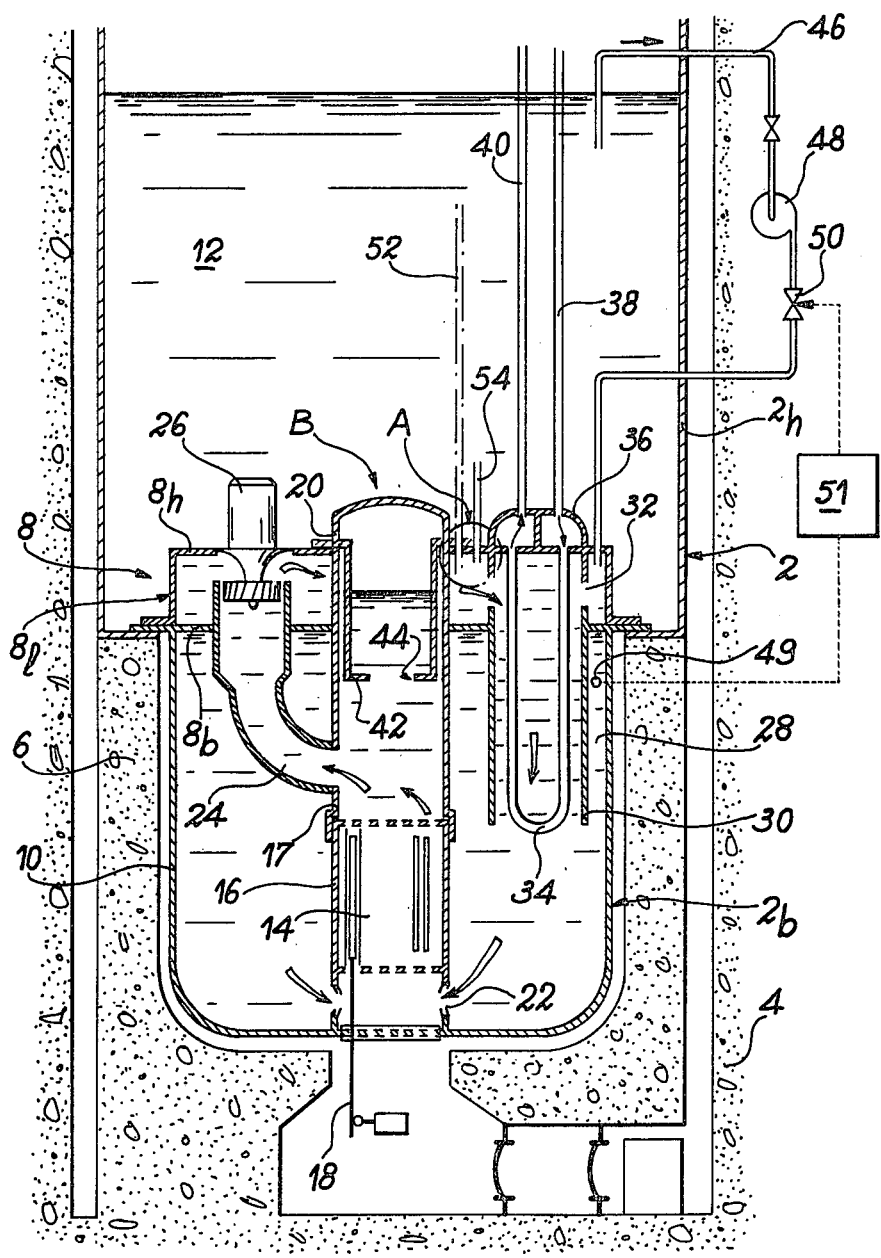
FIG. 1 is a vertical sectional view of the reactor.

As can be seen in FIG. 1, the installation as a whole is contained within a main vessel 2 which is closed at the bottom and open at the top, said vessel being placed within a concrete containment vessel 4 and filled with a coolant fluid.

Said main vessel 2 is divided by means of a compartment 8 having two horizontal partitions 8b and 8h and a vertical shell 8l into two separate upper and lower regions. In conjunction with said compartment 8, the lower region of the main vessel constitutes the reactor tank 10, said tank being intended to contain the primary circuit for the reactor core coolant which consists in this example of water designated as primary water. The upper region of the main vessel constitutes the pool 12 of the reactor, said pool being also filled with water.

It will be noted that the main vessel 2 which is preferably of stainless steel is made up of two distinct portions 2b (lateral wall of the reactor tank 10) and 2h (lateral wall of the pool 12). Each portion rests on a concrete wall 6 which is internal to said containment vessel 4.

A further point worth noting is the fact that said compartment 8 is rigidly fixed to the wall 2b of the reactor tank 10 by any known means; there can thus be distinguished a stationary bottom portion of the reactor tank 10 which permits of underwater inspection and a top portion of said reactor tank which may be withdrawn above the pool in the event of inspection.

The reactor tank 10 contains the core 14 which is constituted by fuel assemblies and surrounded by a cylindrical jacket 16 or so-called core jacket. The lower end of said core jacket 16 is rigidly fixed to the bottom wall of the reactor tank 10 in such a manner as to define passages for control rods such as the rod 18. The upper end of said core jacket is rigidly fixed to a chimney 17 which extends through said compartment 8 in order to house and support a gas accumulator 20.

It is pointed out that the core jacket 16 aforesaid is provided with orifices 22 and 24 respectively for the admission and discharge of primary coolant water into and from the reactor core. Each discharge orifice 24 is connected to a pump 26 for the circulation of coolant water and the outlet of each pump opens into said compartment 8.

Provision is also made within the reactor tank 10 for heat exchangers such as the exchanger 28 which is shown diagrammatically in FIG. 1. By way of example, a reactor of the type illustrated in FIG. 1 can comprise four heat exchangers and four pumps disposed at intervals at the periphery of the reactor tank 10 around the reactor core. It will be readily apparent, however, that this number is not given by way of limitation and depends on the rated power of the reactor.

The heat exchanger 28 is shown diagrammatically in FIG. 1 with its outer cylindrical wall 30, primary water being admitted through the orifices 32 and circulated on the inside of said cylindrical wall.

Provision is made inside the cylindrical wall 30 for U-tubes such as the tube 34 in which water is circulated, that is to say secondary water which is admitted into the water box 36 through the pipe 38 and discharged from said water box through the pipe 40.

It can be noted from FIG. 1 that the aforesaid chimney 17 which forms an extension of the core jacket 16 as well as the cylindrical wall 30 of a heat exchanger 28 are suspended from the partitions 8b and 8h of the compartment 8.

Moreover, it can be observed that, in the reactor design shown in FIG. 1, the water section of the gas accumulator 20 is put into communication with that region of the reactor tank 10 which is internal to the core jacket 16 by means of an opening 44 provided in the bottom wall 42 of said accumulator.

In accordance with an essential feature of the invention, the reactor is provided between the tank 10 and the pool 12 with a water circuit or so-called pressurization circuit for the primary water of the reactor tank 10. Said circuit comprises on the one hand a so-called charge pipe 46, the upper end of which opens into the pool 12 and the lower end of which opens into the compartment 8. Said pipe 46 is fitted with a pump 48 for injecting water from the pool into the reactor tank and with a valve 50 for regulating the rate of injection into the reactor tank through the pipe 46. On the other hand, said circuit comprises two so-called discharge pipes 52 and 54, the lower ends of which open into said compartment 8 and the upper ends of which open into the pool 12 at different levels.

In order to permit of automatic operation of the pressurization circuit, provision is made for a control unit 51 for the valve 50, said control unit being actuated by a detector 49 which serves to determine the pressure of the primary water within the reactor tank 10.

As will hereinafter become more readily apparent, the discharge pipe 52 is not indispensable. The sole function of this latter is to ensure uniform filling of the reactor tank 10 in the event of accidental depressurization of the primary water.

It is also worth remarking that, in accordance with one of the distinctive features of the invention, the vertical shell 8i and the partition 8h of said compartment 8 which are preferably constructed of stainless steel are in contact with the water of the pool 12 over their entire surface.

A further point worth noting is that said shell 8i and said partition 8h are dimensioned and heat-insulated in such a manner as to permit of heat exchange between the primary water of the tank 10 and the water of the pool 12 corresponding to a percentage of the reactor power within the range of 0.5 to 1 under normal operating conditions. To this end, in a reactor in which the respective diameters of the tank 10 and of the pool 12 are respectively 10 and 11 m approximately, the height of the shell 8i is approximately 1 m in respect of a height of approximately 9 m of said reactor tank and said pool. As will be explained hereinafter, this heat exchange process is particularly advantageous in that it permits of emergency cooling of the reactor core after shutdown without thereby disturbing the normal operation of the reactor.

Moreover, it is worthy of note that the above-mentioned mode of emergency cooling of the reactor core does not entail the need for any mechanical component which would call for the use of an external source of energy since the pumps 26 and the heat exchangers 28 are placed at a higher level than that of the reactor core 14, thus permitting circulation of the primary water by natural convection after stoppage of the pumps.

The operation of the coolant water circuit within the reactor tank 10 or primary circuit is as follows. The water enters the core jacket 16 through the orifices 22 and is discharged therefrom through the orifices 24 after being heated in contact with the fuel assemblies. The water is then passed by the pump 26 into the compartment 8 in order to penetrate into the heat exchanger 28 through the orifices 32. Within this heat exchanger 28, the water transfers its heat to the secondary water which circulates within the U-tubes 34. At the outlet of the heat exchanger 28, the water is fed back into the core jacket 16 through the orifices 22.

It is recalled that variations in reactor power as a function of users' requirements in turn give rise to variations in the temperature of the primary water which result in contractions or expansions of the volume of water of the primary circuit.

By virtue of the pressurization circuit of the reactor, the pressure of the primary water can be maintained within predetermined limits at the time of such variations in temperature of the primary water.

The mode of action of the pressurization circuit is as follows.

During reactor operation, the regulating valve 50 modifies the rate of injection of water through the pipe 46 according to the variations in temperature of the primary water in such a manner as to maintain the pressure of the primary water within the reactor tank 10 in the vicinity of a reference value corresponding to normal operation of the reactor.

It is worth mentioning at this point that, when the reactor tank and pool each have a height of approximately 9 m, water from the pool 12 is injected into the tank 10 through the pipe 46 at a pressure of the order of 8 to 9 bar.

Thus a contraction of the volume of primary water calls for an increase in the injection flow rate whilst an expansion calls for a reduction of the injection flow rate.

As can readily be understood, the injection of a certain quantity of water through the pipe 46 corresponds to discharge of a certain quantity of primary water from the reactor tank through the pipes 52 and 54, taking into account the expansion or contraction of the volume of primary water, provision being made for a sufficient pressure drop within said pipes 52 and 54.

Similarly, at the time of a reactor shutdown which produces a contraction of the volume of primary water, the resultant increase in the injection flow rate makes it possible to maintain the pressurization of the primary water at a predetermined value.

It is recalled that, after either a normal or an emergency reactor shutdown, the residual power should be removed from the reactor core 14. In order to achieve this objective, it is the customary practice in such a case either to derive the maximum advantage from the user's power absorption possibilities or to utilize an auxiliary coolant circuit.

In accordance with the invention, emergency core cooling can advantageously result from recovery of residual heat by the primary water which is capable of circulating by natural convection through the reactor core 14, then from transfer of heat from the primary water to the water of the pool 12 through the partition 8h and the shell 8l of the compartment 8, the dimensions of the pool 12 being adapted to heat storage over a sufficient period of time.

Furthermore, it is pointed out that the gas accumulator 20 takes part in regulation of the water pressure within the reactor tank 10 if the response time of the pressurization circuit is too long. Moreover, in the event of occurrence of a fault condition during reactor operation which produces variations in the volume of primary water outside the range of control of the valve 50, the variations in water level within the accumulator serve to maintain the pressure of primary water in the reactor tank 10 within the assigned limits for a sufficient period of time to permit of reactor shutdown if necessary.

Moreover, in the event of a fault condition in the pressurization circuit, depressurization of the primary water is accompanied by boiling of this latter, the steam produced being removed through the discharge pipes 52 and 54. When the pressure of the primary water attains a value below that of the pool water, the reactor tank is again supplied with pool water through the pipe 54 whilst the steam continues to escape through the discharge pipe 52.

Uniform filling of the reactor tank 10 is thus achieved by the presence of two discharge pipes 52 and 54 and the pressure drop within the pipe 54 does not prevent satisfactory re-supply of water to the reactor tank 10.

It is worthy of note that, at the time of operation of the pressurization circuit in the manner mentioned above, a certain quantity of primary water which has a higher temperature than the water of the pool is removed from this latter.

In the description given hereinafter, the primary water of the reactor tank 10 will be designated as "hot" water and the water of the pool 12 will be designated as "cold" water.

In consequence, pressure regulation by the pressurization circuit will produce a loss of power. The preferential forms of construction of the reactor which correspond to FIGS. 2 and 3 accordingly comprise particular arrangements for reducing power losses as far as possible.

These arrangements essentially consist of a container which communicates with the reactor tank 10 and with the pool 12 through at least one of the pipes 52, 54 and the pipe 46. Said container is provided with baffle-plates so arranged as to ensure that a flow of "hot" water from the reactor tank 10 to the pool 12 can be established only at the time of a reduction in the rate of injection of water through the pipe 46.

Figure 2:
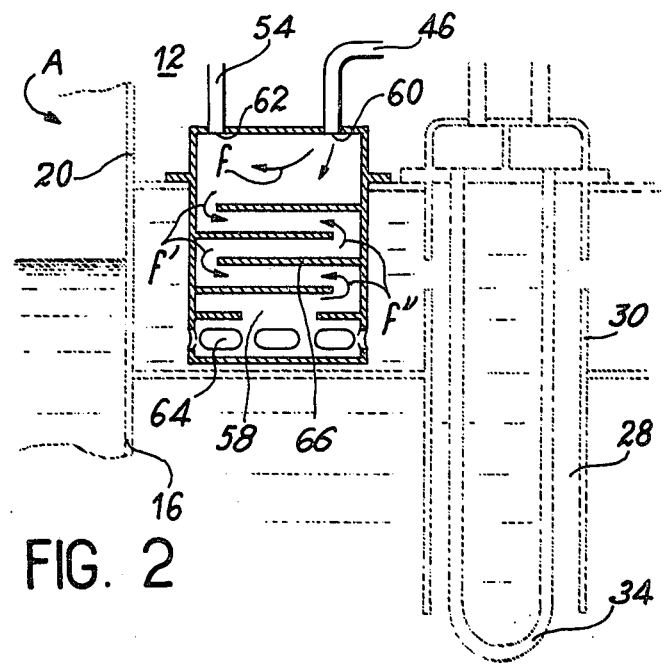
FIG. 2 is a vertical sectional view of that portion of the reactor which corresponds to the portion A of FIG. 1, in a first preferential alternative embodiment.

There can again be seen in FIG. 2, which corresponds to the portion A of the reactor shown in FIG. 1, that zone of the compartment 8 which is located between the wall 16 of the accumulator 20 and the wall 30 of the heat exchanger 28.

It is apparent from this figure that a container 58 is mounted in leak-tight manner so as to pass through the top partition 8h of said compartment 8. The top wall of said container is provided with two orifices 60 and 62 through which open respectively the pipe 46 and the discharge pipe 54. The lower end of said container is provided with orifices 64 which open into said compartment.

In addition to the foregoing, said container is provided with baffle-plates 66 disposed at right angles to its lateral walls in such a manner as to direct the injected water from the orifice 60 to the orifice 62 and to prevent any direct flow of water between the orifice 60 and the orifices 64.

Thus the mode of action of a container 58 as described in the foregoing is as follows. At the time of an increase in the rate of injection of water through the pipe 46, the baffle-plates 66 deviate the stream of injected water in the direction of the arrow f from the orifice 60 to the orifice 62. It is thus ensured that only a fraction of the flow of injected water corresponding to that which is necessary in order to compensate for contraction of the volume of primary water is permitted to pass through the baffle-plates in the direction of the arrows f' and to enter the compartment 8.

At the time of a reduction in the rate of injection of water through the pipe 46, the baffle-plates ensure that the entire quantity of injected water is discharged directly through the orifice 62 in the direction of the arrow f, whereupon a flow of primary water is established along the baffle-plates from the orifices 64 to the orifice 62 in the direction of the arrows f'.

It is thus noted that the interposition of the container 58 between the pool 12 and the reactor tank 10 makes it possible to reduce power losses at the time of pressure regulation while avoiding on the one hand the replacement of "hot" water of the primary circuit by "cold" injected water and, on the other hand, the turbulent mixing of the "cold" water of the container with the primary water.

Figure 3:
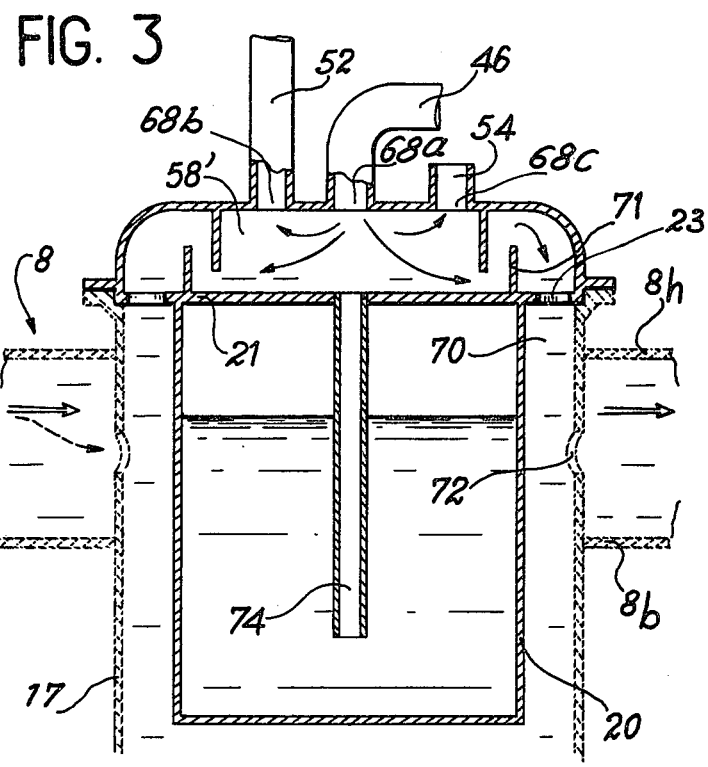
FIG. 3 is a vertical sectional view of the portion B of the reactor of FIG. 1, in a second preferential alternative embodiment.

In FIG. 3, which corresponds to the portion B of the reactor shown in FIG. 1, there is again shown the compartment 8 of the reactor tank 10 which is traversed by the gas accumulator 20.

This figure shows that a plate 21 which is rigidly fixed to the wall of the accumulator 20 delimits within the upper portion of this latter a container 58' which is intended to perform the same functions as the container 58 of FIG. 2.

It is apparent from this figure that said accumulator 20 is provided on the top face thereof with orifices 68a, 68b and 68c through which the pipes 46, 52 and 54 are intended to open and that said plate 21 is provided at its periphery with orifices 23 which open into the annular passage 70. Said passage is delimited around said accumulator 20 by the chimney 17 and communicates with the compartment 8 through orifices 72 so that a flow of hot water can thus be established within the passage 70 by means of a small fraction of the discharge flow from the pumps.

It is further apparent from this figure that said container 58' is provided with baffles 71 which are arranged in a suitable manner between the orifices 68a, 68b, 68c and 23.

Another noteworthy feature which is provided in the alternative embodiment shown in FIG. 3 lies in the fact that the water section of said gas accumulator communicates with said container 58' by means of a pipe 74.

Figure 4:
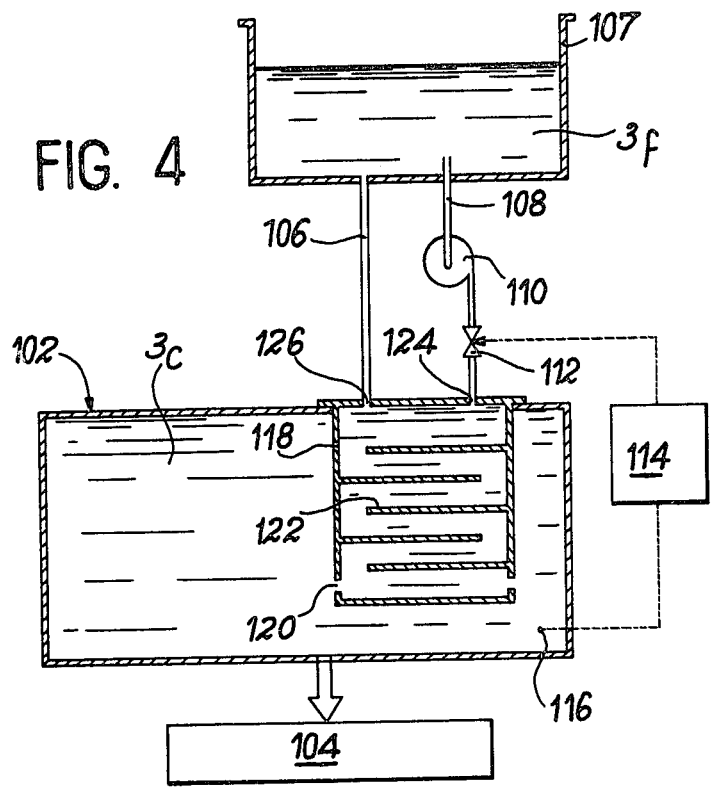
FIG. 4 is a sectional view of a device in accordance with the invention for regulating the pressure of a fluid contained in a leak-tight chamber which communicates with a fluid storage reservoir.

In FIG. 4, there is shown a device for regulating the pressure of a hot fluid contained within a leak-tight chamber 102, said fluid being intended to receive heat from a heat source and to transfer part of the heat received to a utilization circuit 104.

As shown in this figure, said chamber 102 is put into communication through a pipe 106 with an open-topped reservoir 107. This latter contains fluid 3f or cold fluid which differs from the fluid 3c of the main vessel 2 only in the values of temperature and pressure.

The regulating device illustrated in FIG. 4 is essentially constituted by a fluid circuit placed between said reservoir 107 and said chamber 102 and comprising a container 118. The pipe 106 mentioned earlier opens at its lower end through the orifice 126 into said container 118 whilst a pipe 108 opens at one end into the reservoir 107 and at the other end into the container 118 through the orifice 124. The pipe 108 is provided with a pump 110 for injecting into the chamber 102 a fraction of the fluid 3f and a flow-regulating fluid valve 112 serves to control the rate of injection of cold fluid 3f into the chamber 102.

In order to permit automatic operation of the fluid circuit mentioned above, said circuit is provided with a unit 114 for controlling the valve 112, said control unit being actuated by a detector 116 which serves to determine the pressure of the fluid 3c.

In accordance with another feature of the invention which deserves mention, the aforesaid container 118 which is mounted in leak-tight manner through the wall of the aforesaid chamber 102 and provided with orifices 120 at the lower end is also provided with an array of baffle-plates 122, the particular arrangement of which will be explained in detail hereinafter.

The device described in the foregoing makes it possible to maintain the pressure of the hot fluid of the chamber 102 within predetermined limits irrespective of the variations in temperature of said fluid, for example in the vicinity of a reference value at which said hot fluid is maintained in the liquid state when its temperature (which is a function of the heat demand within the circuit 104) is higher than its boiling point at atmospheric pressure.

In fact, depending on the variations in temperature of the fluid 3c, the regulating valve 112 modifies the rate of injection of fluid 3f through the pipe 108 into the container 118 and consequently into the chamber 102 in such a manner as to maintain the pressure of the fluid 3c in the vicinity of a reference value. Thus a contraction of the volume of fluid 3c calls for an increase in the rate of injection through the pipe 108 whilst an expansion calls for a reduction in the injection flow rate.

The container 118 is interposed within the pressurization circuit between the chamber 102 and the reservoir 107 so as to ensure that injection of a certain quantity of fluid 3f corresponds to discharge of a certain quantity of fluid 3c only at the time of expansion of this latter. In other words, the container 118 is intended to minimize heat losses at the time of pressure regulation of the fluid 3c.

To this end, the baffle-plates 122 of said container 118 are so arranged that a flow of fluid 3c from the chamber 102 to the reservoir 107 can be established only at the time of a reduction in the rate of injection of fluid 3f.

In more precise terms, the aforesaid baffle-plates 122 which are located at right angles to the lateral walls of the container 118 are placed in such a manner as to ensure that the fluid 3f which is injected into the container 118 is directed from the orifice 124 to the orifice 126 as soon as it enters said container and in such a manner as to prevent any direct flow of fluid between the orifice 124 and each of the orifices 120.

Figures 5A, 5B:
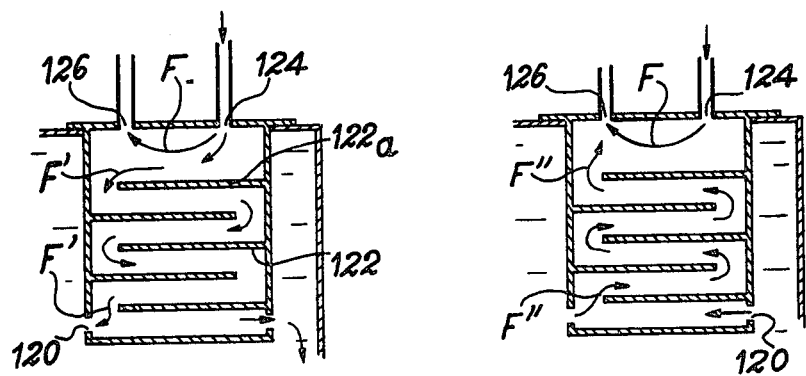
FIGS. 5a and 5b are diagrams which present the mode of action of the container of the device shown in FIG. 4.

The mode of action of the container 118 as shown diagrammatically in FIGS. 5a and 5b is identical with that of the containers 58, 58' of FIGS. 2 and 3. Thus, at the time of an increase in the rate of injection of fluid 3f through the pipe 108 (FIG. 5a), the top baffle-plate 122a deviates the stream of fluid 3f which has been injected in the direction of the arrow F from the orifice 124 to the orifice 126. In this manner, only a fraction of the flow of injected liquid corresponding to that which is necessary in order to compensate for contraction of volume of the fluid 3c passes through the baffle-plates 122 in the direction of the arrow F'.

At the time of a reduction in the rate of injection of fluid 3f, the baffle-plate 122a ensures that the entire quantity of injected fluid 3f is discharged directly through the orifice 126 in the direction of the arrow F, whereupon a flow of hot fluid 3c is established through the baffle-plates 122 in the direction of the arrow F'' from the orifices 120 to the orifice 126.

Thus the container 118 makes it possible to reduce heat losses at the time of pressure regulation while preventing on the one hand the replacement of hot fluid 3c by cold fluid 3f and on the other hand any turbulent mixing of the fluid of the container with the fluid of the chamber.

What we claim is:

1. A heat-generating nuclear reactor comprising a vessel filled with coolant fluid; a horizontal wall dividing said vessel into an upper region and a lower region, a reactor core in said lower region, at least one heat exchanger in said lower region, at least one primary pump in said lower region for circulating a part of the coolant fluid between an outlet and an inlet of said reactor core through said heat exchanger, and means for establishing an over-pressure in said lower region, wherein said means comprise at least two pipes which open at one end into said lower region and at another end into said upper region, one of said pipes having at least one pump for injecting a part of the fluid of said upper region into said lower region thereby establishing said overpressure in said lower region whatever the state of said primary pump, said one pipe also having means for regulating the rate of injection of fluid into said lower region, control means activating said regulating means and said control means being responsive to a signal generated by means for detecting the pressure of the fluid in said lower region.

2. A reactor according to claim 1, including a compartment forming said horizontal wall, said compartment communicating with said lower region, a vertical shell and two horizontal partitions defining said compartment, said partitions consisting respectively of a lower partition and an upper partition, said vertical shell and said upper partition being in contact with the fluid of said upper region and having dimensions and thermal resistance permitting a heat exchange between the fluids of said lower and upper regions corresponding to a percentage of the thermal power of the reactor within the range of 0.5 to 1.

3. A reactor according to claim 2, wherein said at least one pump and said at least one heat exchanger are at a higher level than said reactor core, the inlet of said at least one heat exchanger and the outlet of said at least one pump open into said compartment.

4. A reactor according to claim 1 or claim 2 or claim 3, wherein said reactor includes three pipes, one of said pipes being connected to said injection pump and said regulating means and the other two of said pipes opening respectively at one end thereof into a bottom zone and at the other end thereof into a top zone of said upper region.

5. A reactor according to claim 1 or claim 2 or claim 3, wherein said reactor includes a gas accumulator and a water section for said accumulator communicating with said lower region.

6. A reactor according to claim 1, including a cylindrical jacket surrounding said reactor core and surmounted by said gas accumulator, an extension of said cylindrical jacket above said reactor core housing and supporting said accumulator which extends through said compartment.

7. A heat-generating nuclear reactor comprising a vessel filled with coolant fluid and divided by a horizontal wall into an upper region and a lower region which contains the reactor core, at least one heat exchanger, at least one primary pump for circulating part of the coolant fluid between an outlet and an inlet of said reactor core through said heat exchanger, and means for establishing an overpressure in the lower region, said means comprising at least two pipes which open at one end into the lower region and at the other end into the upper region, one of said pipes being connected to at least one pump for injecting a part of the fluid of the upper region into the lower region, means for regulating the rate of injection of fluid into the lower region as a function of the variations in pressure of the fluid within the lower region, said reactor further comprising a container which communicates directly with the lower region and with the upper region through said pipes, baffle-plates within said container, the flow of fluid between the two regions being through said baffle-plates whereby a flow of fluid from the lower region to the upper region is established only at the time of a reduction in the rate of injection of fluid into the container through said one pipe.

8. A reactor according to claim 7, including a compartment forming said horizontal wall, said compartment communicating with said lower region, said compartment having a vertical shell and a lower horizontal partition and an upper horizontal partition, said container extending in leak-tight manner through the upper partition, a top face of said container having at least two orifices receiving said pipes and a lower end of said container having orifices which open into said compartment.

9. A reactor according to claim 8, including a cylindrical jacket surrounding said reactor core and surmounted by a gas accumulator, a water section for said accumulator communicating with the lower region, said container being in an upper portion of said accumulator, said orifices in the lower end of said container opening into an annular passage around said accumulator defined by an extension of said core jacket, said annular passage communicating with said compartment.

10. A reactor according to claim 9, wherein said water section of said gas accumulator communicates with said container.

* * * * *